March 10, 1970   G. M. CUSTER   3,499,624
TRAILER HITCH LUBRICATOR
Filed July 10, 1967

INVENTOR:
George M. Custer
BY Bedell & Burgess
ATTORNEYS

United States Patent Office 3,499,624
Patented Mar. 10, 1970

3,499,624
TRAILER HITCH LUBRICATOR
George M. Custer, Lancaster, Pa., assignor to Hennessy Products, Inc., Chambersburg, Pa., a corporation of Delaware
Filed July 10, 1967, Ser. No. 652,133
Int. Cl. B60p 7/08, 3/06; F16n 11/00
U.S. Cl. 248—119    1 Claim

ABSTRACT OF THE DISCLOSURE

Collapsible hitch mechanism for a trailer vehicle including a thrust screw provided with a threaded nut for operating the hitch mechanism with associated lubricant container and screw wiping elements.

FIELD OF THE INVENTION

When a railway flatcar, or similar car, is used for transporting highway trailer vehicles, it is common practice to provide a hitch mechanism on the car with a support member for the front end of the vehicle which would be carried on a tractor when the trailer is traveling on a highway. The hitch structure includes a heavy rotatable thrust screw, held against axial movement, and a nut threaded on the screw is moved lengthwise of the screw as the screw is rotated and acts through hinged struts to raise and lower the trailer support member.

DESCRIPTION OF THE PRIOR ART

Due to the friction between the screw and nut and the exposure of those parts to dirt and weather, it is important to lubricate them, and a pliable jacket has been used for this purpose, as illustrated in Patent 3,188,982. Such a jacket must collapse or lengthen when the hitch is raised and lowered, and may be easily torn or cut accidentally or intentionally.

SUMMARY OF THE INVENTION

The object of the present invention is to clean and lubricate a trailer hitch screw and nut of the type mentioned, and to maintain a source of lubricant free from failure as referred to and readily serviced, and observable as to operating condition.

DESCRIPTION OF THE PREFERRED EMBODIMENT

Figures 1, 2, 3, 4:
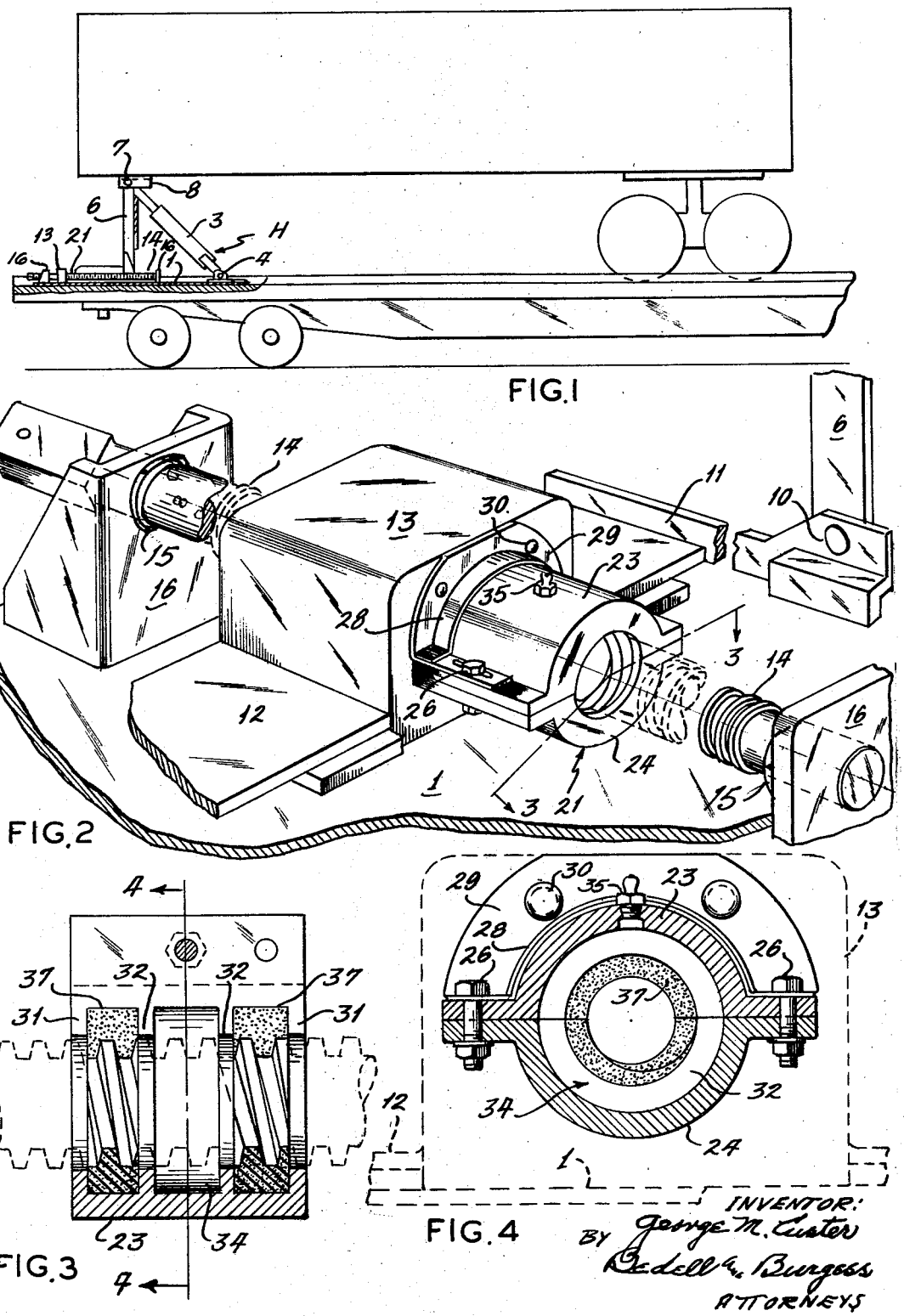
FIG. 1 illustrates approximately one half of a railway flatcar carrying a highway trailer, one end of which is supported by a trailer hitch mechanism adapted to be raised to the position shown to support the forward portion of the trailer, or collapsed to permit the trailer or the wheels of a tractor to move over the collapsed hitch.
FIG. 2 is a perspective, drawn to an enlarged scale, and illustrates the hitch yoke or traveling shoe which mounts one of the hitch struts and is moved lengthwise of the car floor when the hitch is being raised and collapsed.
FIG. 3 is a substantially horizontal section on line 3—3 of FIG. 2, showing details of the lubricator device.
FIG. 4 is a detail section on line 4—4 of FIG. 3.

The hitch H is provided with a base 1 mounted on or forming a part of the car body. A pair of struts 3, spaced apart transversely of the car have their lower ends pivoted at 4 to base 1. Cooperating struts 6 have their upper ends pivoted at 7 to the upper ends of struts 3 and to a saddle 8 for engagement with the trailer centerplate mounted on a tractor when the trailer is in highway service. The lower ends of struts 6 are pivoted at 10 to a yoke including spaced side bars 11 and a crosspiece or shoe 12. The yoke and shoe are slidable along base 1. A nut 13 carried by shoe 12 is threaded to engage a screw 14 journaled in brackets 16 fixed to base 1. Collars 15 hold the screw against axial movement through the nut. When the screw is rotated, nut 13 travels along the screw and the yoke moves the lower ends of struts 6 toward or away from the lower ends of struts 3 to elevate or collapse the hitch. This structure is known in the art.

The high pressure thrust between nut 13 and screw 14 and the dirt and corrosion to which the interengaged screw threads are subjected make an effective wiping and lubricating device desirable, and FIGS. 2, 3, and 4 detail such a device in a unit applicable to the screw and nut and embodying a cylindrical casing 21 preferably split lengthwise along a plane passing through the cylinder axis into two halves 23, 24 normally secured together by bolts 26. The upper half 23 is provided with a semicircular collar 28 with a flange 29 for mounting the casing on an end face of nut 13 by attaching screws 30.

Each end portion of the casing has a pair of spaced apart transverse walls 31, 32, and the two innermost transverse walls 32 are spaced apart lengthwise of the casing and these walls cooperate with the casing outer wall to form a lubricant-receiving compartment 34 having an inlet supply valve 35.

A wiper sleeve, or disk, 37 is posiitoned in the space between each pair of transverse end walls 31, 32. This sleeve is preferably of a relatively soft plastic, polyvinyl chloride, for example, or other material which may closely fit the screw threads and prevent the inward passage of dirt, etc. and the outward leakage of lubricant. The sleeves will wear to a close fit, and may be adjusted relative to the screw by loosening bolts 26 and shifting casing 21 relative to nut 13 to maintain such fit.

Although the lubricating device is shown attached directly to the nut, it may be attached to another member forming part of, or associated with, the sliding yoke or shoe and traveling lengthwise of screw 14 as the hitch is raised and lowered. The exclusive use of this and other modifications coming within the scope of the claims is contemplated.

What is claimed is:
1. Trailer hitch structure for elevating and lowering a trailer vehicle support on an elongated base, a yoke slidable over the base, a strut with a lower portion provided with a pivot for connection to said base, a second strut having one end pivoted to another portion of the first strut and having its other end pivoted to said yoke, means for thrusting said yoke lengthwise of said base toward and away from the lower portion of the first strut and comprising a screw elongated lengthwise of said base and rotatable thereon, a stop holding said screw against axial movement relative to said base, a traveling nut secured to said yoke threaded onto said screw, and a lubricator for the screw comprising a hollow casing secured to said nut to travel therewith, said casing having a pair of inner and outer transverse walls spaced apart near each end thereof, the space between the inner walls of said pairs forming a lubricant compartment, wiper sleeves between the walls of each of said pairs and being threaded to fit the screw threads, said casing and wiper sleeves being split lengthwise in separate parts and said casing parts having longitudinally extending side flanges, and detachable elements securing the flanges together and holding the separable parts of the wiper sleeves closely to the screw, a collar on one end of the casing having a radial flange secured to the nut and provided with a pair of longitudinal extensions adjustably secured to said side flanges on the casing by said detachable elements whereby the lubricator is secured to the nut to travel therewith.

References Cited

UNITED STATES PATENTS

| | | | |
|---|---|---|---|
| 1,509,906 | 9/1924 | Sawtelle | 184—15 |
| 2,370,314 | 2/1945 | Jenner | 184—15 |
| 2,435,120 | 1/1948 | Baker | 184—15 |
| 2,606,454 | 8/1952 | Westling | 74—467 |
| 2,982,145 | 1/1961 | Orner | 74—424.8 |
| 3,132,719 | 5/1964 | Cole | 74—424.8 |
| 3,235,211 | 2/1966 | Robinson et al. | 248—119 |
| 3,246,866 | 4/1966 | Price et al. | 248—119 |

FRANCIS K. ZUGEL, Primary Examiner

U.S. Cl. X.R.

74—424.8; 105—368; 184—6